US010743266B2

United States Patent
Lin

(10) Patent No.: US 10,743,266 B2
(45) Date of Patent: Aug. 11, 2020

(54) TERMINAL DEVICE DETERMINING DIFFERENT TRANSMIT POWERS FOR USE DURING DIFFERENT TRANSMIT PERIODS

(71) Applicant: GUANGDONG OPPO MOBILE TELECOMMUNICATIONS CORP., LTD., Dongguan, Guangdong (CN)

(72) Inventor: Yanan Lin, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 16/340,682

(22) PCT Filed: Nov. 3, 2016

(86) PCT No.: PCT/CN2016/104477
§ 371 (c)(1),
(2) Date: Apr. 9, 2019

(87) PCT Pub. No.: WO2018/081992
PCT Pub. Date: May 11, 2018

(65) Prior Publication Data
US 2019/0297587 A1    Sep. 26, 2019

(51) Int. Cl.
*H04W 52/30*    (2009.01)
*H04W 52/18*    (2009.01)
*H04W 52/26*    (2009.01)
*H04W 52/36*    (2009.01)
(Continued)

(52) U.S. Cl.
CPC ....... *H04W 52/367* (2013.01); *H04W 52/146* (2013.01); *H04W 52/18* (2013.01);
(Continued)

(58) Field of Classification Search
CPC ... H04W 52/30; H04W 52/34; H04W 52/346; H04W 52/38; H04W 52/386;
(Continued)

(56) References Cited

U.S. PATENT DOCUMENTS

2006/0003787 A1    1/2006    Heo et al.
2010/0142455 A1*   6/2010    Imamura ............. H04W 52/146
                                                          370/329
(Continued)

FOREIGN PATENT DOCUMENTS

CN    1251731    4/2000
CN    1750675    3/2006
(Continued)

OTHER PUBLICATIONS

WIPO, ISR for PCT/CN2016/104477, dated Jul. 21, 2017.
(Continued)

*Primary Examiner* — Philip Sobutka
(74) *Attorney, Agent, or Firm* — Hodgson Russ LLP

(57) ABSTRACT

A communication method implemented by a terminal device includes: determining whether a power lower than a target transmission power of a first channel or signal is allowed to be used to transmit the first channel or signal during a first period within a time unit, wherein the transmission power available to transmit the first channel or signal during the first period is different with at least one of other periods within the time unit; determining a current transmit power to be used to transmit the first channel or signal during the first period based on the transmission power available when the power lower than the target transmission power is allowed to be used to transmit the first channel or signal during the first period; transmitting the first channel or signal during the first period with the current transmit power.

14 Claims, 5 Drawing Sheets

(51) Int. Cl.
*H04W 52/14* (2009.01)
*H04W 72/04* (2009.01)
*H04W 52/28* (2009.01)

(52) U.S. Cl.
CPC ....... *H04W 52/262* (2013.01); *H04W 52/267* (2013.01); *H04W 72/0413* (2013.01); *H04W 72/0446* (2013.01); *H04W 52/281* (2013.01)

(58) Field of Classification Search
CPC ..... H04W 52/42; H04W 52/00; H04W 52/04; H04W 52/06; H04W 52/10; H04W 52/14; H04W 52/146; H04W 52/262; H04W 52/267; H04W 52/281; H04W 52/367; H04W 72/0413; H04W 72/0446
USPC ........................................................ 455/522
See application file for complete search history.

(56) References Cited

U.S. PATENT DOCUMENTS

| | | | |
|---|---|---|---|
| 2014/0294110 | A1 | 10/2014 | Cheong et al. |
| 2014/0349701 | A1 | 11/2014 | Vajapeyam et al. |
| 2015/0063245 | A1* | 3/2015 | Gao ................... H04W 52/346 370/329 |
| 2015/0319707 | A1 | 11/2015 | Abdelmonem et al. |

FOREIGN PATENT DOCUMENTS

| | | |
|---|---|---|
| CN | 101005297 | 7/2007 |
| CN | 102196549 | 9/2011 |
| CN | 102238716 | 11/2011 |
| CN | 102355717 | 2/2012 |
| CN | 102356675 | 2/2012 |
| CN | 104812046 | 7/2015 |
| CN | 105792096 | 7/2016 |
| KR | 101706805 | 2/2017 |
| WO | 2011050921 | 5/2011 |
| WO | 2014131187 | 9/2014 |

OTHER PUBLICATIONS

TIPO, Office Action for Taiwanese Application No. 106137478, dated May 8, 2019.
EPO, European Search Report for EP Appl. No. 16920704.0, dated Jul. 10, 2019.
CNIPA, First Office Action for CN Application No. 201680089162.4, dated Dec. 4, 2019.
SIPO, Second Office Action for CN Application No. 201680089162.4, dated Mar. 20, 2020.
SIPO, Third Office Action for CN Application No. 2016800891624, dated May 12, 2020.

* cited by examiner

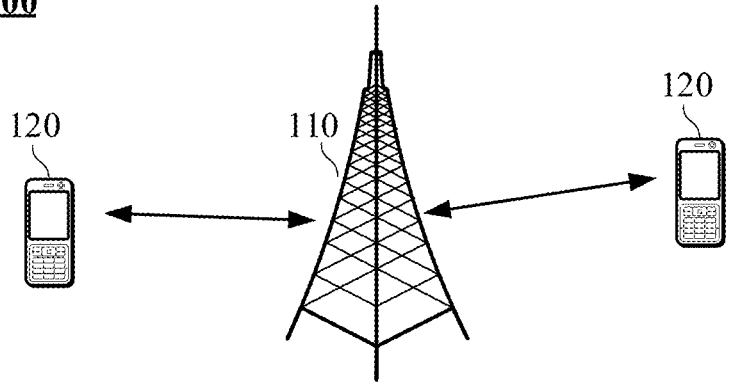

FIG. 1

200 a Terminal Device Determines Whether a Power Lower Than a Target Transmission Power of a First Channel or Signal Can Be Used to Transmit the First Channel or Signal During a First Period Within a Time Unit When a Transmission Power Available to Transmit the First Channel or Signal During the First Period Is Lower Than the Target Transmission Power — 210 the Terminal Device Determines a Current Transmit Power for the First Channel or Signal Based on the Transmission Power Available to Transmit the First Channel or Signal During the First Period When It Is Determined That the Power Lower Than the Target Transmission Power Can Be Used to Transmit the First Channel or Signal During the First Period — 220 the Terminal Device Transmits the First Channel or Signal During the First Period with the Current Transmit Power — 230

310 — a Network Device Receives Indication Information Transmitted from a Terminal Device in a Time Unit 320 — the Network Device Determines Transmission of a First Channel or Signal During a First Period in the Time Unit Based on the Indication Information, Wherein a Transmission Power Available for the Terminal Device to Transmit the First Channel or Signal During the First Period is Different from a Power Available for the Terminal Device to Transmit the First Channel or Signal During at Least One of Other Periods Within the Time Unit

FIG. 6

Terminal Device 400

Processing Unit — 410

Transmitting Unit — 420

FIG. 7

TERMINAL DEVICE DETERMINING DIFFERENT TRANSMIT POWERS FOR USE DURING DIFFERENT TRANSMIT PERIODS

CROSS-REFERENCE TO RELATED APPLICATIONS

This application is a National Stage Entry of International Application No. PCT/CN2016/104477, filed on Nov. 3, 2016, the entire disclosure of which is incorporated herein by reference.

TECHNICAL FIELD

Embodiments of the present application relate to the field of communications, and, more particularly, to a communication method, a terminal device, and a network device.

BACKGROUND

With the development of the mobile communication technology, the fifth generation of mobile communication technology (fifth generation, 5G) is currently under study. In 5G technology, the transmission power of a terminal device has an important impact on communication performance.

Therefore, how to properly allocate the transmission power of the terminal device is a problem to be studied.

SUMMARY

Embodiments of the present application provide a communication method and device.

In a first aspect, there is provided a communication method comprising:
determining, by a terminal device, whether a power lower than a target transmission power of a first channel or signal can be used to transmit the first channel or signal during a first period within a time unit when a transmission power available to transmit the first channel or signal during the first period is lower than the target transmission power, wherein the transmission power available to transmit the first channel or signal during the first period is different from a power available to transmit the first channel or signal during at least one of other periods within the time unit;
determining, by the terminal device, a current transmit power for the first channel or signal based on the transmission power available to transmit the first channel or signal during the first period when it is determined that the power lower than the target transmission power can be used to transmit the first channel or signal during the first period;
transmitting, by the terminal device, the first channel or signal during the first period with the current transmit power.

In a second aspect, there is provided a communication method comprising:
receiving, by a network device, indication information transmitted from a terminal device in a time unit;
determining, by the network device, transmission of a first channel or signal during a first period in the time unit based on the indication information, wherein a transmission power available for the terminal device to transmit the first channel or signal during the first period is different from a power available for the terminal device to transmit the first channel or signal during at least one of other periods within the time unit.

In the third aspect, there is provided a terminal device comprising units for performing methods in the first aspect or possible implementations thereof.

In the fourth aspect, there is provided a network device comprising units for performing methods in the second aspect or possible implementations thereof.

In the fifth aspect, there is provided a terminal device comprising a processor and a transceiver, wherein the processor is configured to perform methods in the first aspect or possible implementations thereof based on the transceiver.

In the sixth aspect, there is provided a network device comprising a processor and a transceiver, wherein the processor is configured to perform methods in the second aspect or possible implementations thereof based on the transceiver.

In the seventh aspect, there is provided a computer-readable medium used for storing a program code to be performed by a terminal device, wherein the program code comprises instructions for performing methods in the first aspect or possible implementations thereof.

In the eighth aspect, there is provided a computer-readable medium used for storing a program code to be performed by a network device, wherein the program code comprises instructions for performing methods in the second aspect or possible implementations thereof.

In a ninth aspect, there is provided a system on chip comprising an input interface, an output interface, a processor and a memory, wherein the processor is configured to perform a code in the memory and to implement methods in the first aspect or possible implementations thereof when the code is executed.

In a tenth aspect, there is provided a system on chip comprising an input interface, an output interface, a processor and a memory, wherein the processor is configured to perform a code in the memory and to implement methods in the second aspect or possible implementations thereof when the code is executed.

BRIEF DESCRIPTION OF THE DRAWINGS

Accompanying drawings used to describe embodiments or the prior art will be introduced briefly below in order to illustrate the technical solutions of embodiments of the present application more clearly. Obviously, the accompanying drawings in the following description are merely for some embodiments of the present application, and other drawings can also be obtained based on these accompanying drawings by a person having ordinary skill in the art without creative efforts.

FIG. 1 is a schematic diagram of a communication system according to embodiments of the present application.

FIG. 2 is a schematic flow chart of a communication method according to an embodiment of the present application.

FIG. 6 is a schematic flow chart of a communication method according to another embodiment of the present application.

FIG. 7 is a schematic block diagram of a terminal device according to an embodiment of the present application.

DETAILED DESCRIPTION

Figure 3:
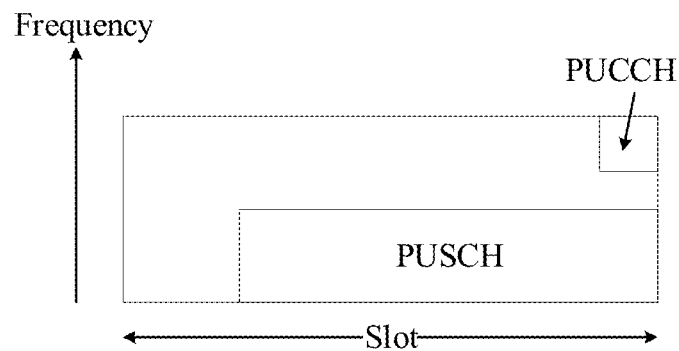
FIG. 3 is a schematic diagram of transmission of a channel or signal within a time unit according to an embodiment of the present application.

The technical solutions in embodiments of the present application will be described in the following in combination with accompanying drawings so the embodiments of the present application.

Embodiments of the present application can be applied in various kinds of communication systems such as Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or a future 5G system, and so on.

FIG. 1 illustrates a wireless communication system 100 applied in embodiments of the present application. The wireless communication system 100 can include a network device 110 which is a device capable to communicate with a terminal device. The network device 100 can provide communication coverage for a specific geographic area and communicate with terminal devices (for example, UEs) located in the coverage. In an embodiment of the present application, the network device 100 may be a BTS (Base Transceiver Station) in GSM (Global System for Mobile Communications) or CDMA (Code Division Multiple Access) system, an NB (NodeB) in a WCDMA (Wideband Code Division Multiple Access) system, an eNB or eNodeB (Evolutional Node B) in an LTE system, or a wireless controller in a CRAN (Cloud Radio Access Network). Alternatively, the network device may be a relay station, an access point, a vehicle-mounted device, a wearable device, a network device in a future 5G network, a network device in a future evolved PLMN (Public Land Mobile Network), or the like.

The wireless communication system 100 further includes at least one terminal device 120 located in the coverage of the network device 110. The terminal device 120 may be moving or stationary. In an embodiment of the present application, the terminal device 120 may be an access terminal, a UE (User Equipment), a user unit, a user station, a mobile radio station, a mobile station, a remote station, a remote terminal, a mobile device, a user terminal, a terminal, a wireless communication device, a user agent or a user device. An access terminal may be a cell phone, a cordless phone, an SIP (Session Initiation Protocol) phone, a WLL (Wireless Local Loop) station, a PDA (Personal Digital Assistant), a hand-held device with a wireless communication function, a computing device or other processing devices connected to a wireless modem, a vehicle-mounted device, a wearable device, a terminal device in a future 5G network, a terminal device in a future evolved PLMN (Public Land Mobile Network), or the like.

In an embodiment of the present application, a 5G system or network may also be called as a NR (New Radio) system or network.

FIG. 1 illustratively shows one network device and two terminal devices. Alternatively, the wireless communication system 100 may include multiple network devices, the coverage of each of which may cover other numbers of terminal devices. Embodiments of the present application do not have any limit on this.

Alternatively, the wireless communication system 100 may further include other network entities such as a network controller, a mobility management entity, and the like. Embodiments of the present application do not have any limit on this.

It should be understood that the terms "system" and "network" herein are exchangeable. The term "and/or" herein only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.

FIG. 2 is a schematic flow chart of a communication method 200 according to an embodiment of the present application. As shown in FIG. 2, the method 200 includes the following.

At 210, a terminal device determines whether a power lower than a target transmission power of a first channel or signal can be used to transmit the first channel or signal during a first period within a time unit when a transmission power available to transmit the first channel or signal during the first period is lower than the target transmission power.

In an embodiment of the present application, the transmission power available to transmit the first channel or signal during the first period is different from a power available to transmit the first channel or signal during at least one of other periods within the time unit;

In an embodiment of the present application, the transmission power available to transmit the first channel or signal during the first period is different from a power available to transmit the first channel or signal during an adjacent period of the first period within the time unit. Specifically, the adjacent period may be the last period prior to the first period.

In an embodiment of the present application, in embodiments of the present application, the period can be divided based on transmission of channels or signals, for example, on the numbers or types of the channels or signals.

In an embodiment of the present application, a period can be continuous or discrete in time.

For example, in a time unit, PUSCH and PUCCH are firstly transmitted simultaneously, then only PUCCH is transmitted, then only PUSCH is transmitted, and finally PUSCH and PUCCH are transmitted simultaneously.

In a mode, the time used to simultaneously transmit PUSCH and PUCCH at first can be divided as a period, the time used to transmit only PUCCH as a period, the time used to transmit only PUSCH as a period, and the time used to simultaneously transmit PUSCH and PUCCH at the end as a period.

In a mode, the time used to simultaneously transmit PUSCH and PUCCH at first and at the end can be divided as a period, and the time used to transmit only PUCCH as a period, and the time used to transmit only PUSCH as a period.

In a mode, the time used to simultaneously transmit PUSCH and PUCCH at first and at the end can be divided as a period, and the time used to transmit only PUCCH and the time used to transmit only PUSCH as a period.

In an implementation, the time used to simultaneously transmit PUSCH and PUCCH at first and at the end can be divided as a period, the time used to transmit only PUCCH as a period, and the time used to transmit only PUSCH as a period.

In an embodiment of the present application, in embodiments of the present application, the time unit may be but not limited to a frame, a subframe, a slot or a short slot.

In an embodiment of the present application, the target transmission power of the first channel or signal may be a preset transmission power or a transmission power determined in other ways.

In an embodiment of the present application, the first channel or signal may be a PUSCH (Physical Uplink Shared Channel) or a sounding reference signal. Alternatively, it may be another channel or signal such as a PUCCH (Physical Uplink Control Channel).

In an embodiment of the present application, the terminal device determines whether the power lower than the target transmission power can be used to transmit the first channel or signal during the first period based on a modulation mode and/or a modulation coding level of the first channel or signal.

In an implementation, it is determined that the power lower than the target transmission power can be used to transmit the first channel or signal during the first period when the modulation mode of the first channel or signal is a specific modulation mode, wherein an amplitude of a modulated symbol obtained by using the specific modulation mode is constant.

In an implementation, it can be determined that the power lower than the target transmission power can not be used to transmit the first channel or signal during the first period when the modulation mode of the first channel or signal is not the specific modulation mode.

It should be understood that a constant amplitude of the modulated symbol obtained by using the specific modulation mode may refer to a generally constant amplitude.

In an embodiment of the present application, the specific modulation mode may be PSK (Phase Shift Keying) modulation, MSK (Minimum-Shift Keying) modulation, FSK (Frequency-shift keying) modulation, and so on.

In an implementation, it is determined that the power lower than the target transmission power can be used to transmit the first channel or signal during the first period when the modulation coding level of the first channel or signal is equal to or lower than a first threshold.

In an implementation, it is determined that the power lower than the target transmission power can not be used to transmit the first channel or signal during the first period when the modulation coding level of the first channel or signal is higher than the first threshold.

In an implementation, it is determined that the power lower than the target transmission power can be used to transmit the first channel or signal during the first period when the modulation mode of the first channel or signal is a specific modulation mode and the modulation coding level of the first channel or signal is equal to or lower than the first threshold.

Thus, in embodiments of the present application, it is determined based on the modulation mode and/or the modulation level as to whether the power lower than the target transmission power can be used to transmit the first channel or signal during the first period. It is possible to ensure a constant amplitude of the modulated symbol even in the case that the transmission power for the first channel or signal is reduced.

In an embodiment of the present application, the terminal device determines whether the power lower than the target transmission power can be used to transmit the first channel or signal during the first period based on whether a reference signal for the first channel or signal is transmitted during the first period.

In an implementation, it is determined that the power lower than the target transmission power can be used to transmit the first channel or signal during the first period if the reference signal for the first channel or signal is transmitted during the first period.

In an implementation, it is determined that the power lower than the target transmission power can not be used to transmit the first channel or signal during the first period if the reference signal for the first channel or signal is not transmitted through the first channel or signal during the first period.

In an embodiment of the present application, the reference signal may be used by the network device to evaluate the first channel or signal.

In an embodiment of the present application, the terminal device determines whether the power lower than the target transmission power can be used to transmit the first channel or signal during the first period based on indication information from the network device.

In an implementation, it is determined that the power lower than the target transmission power can be used to transmit the first channel or signal during the first period when the indication information indicates that the power lower than the target transmission power can be used to transmit the first channel or signal.

In an implementation, it is determined that the power lower than the target transmission power can not be used to transmit the first channel or signal during the first period when the indication information indicates that the power lower than the target transmission power can not be used to transmit the first channel or signal.

In an implementation, it is determined that the power lower than the target transmission power can not be used to transmit the first channel or signal during the first period when the indication information indicating that the power lower than the target transmission power can be used to transmit the first channel or signal is not received by the terminal device.

In an implementation, it is determined that the power lower than the target transmission power can be used to transmit the first channel or signal during the first period when the indication information indicating that the power lower than the target transmission power can not be used to transmit the first channel or signal is not received by the terminal device.

At 220, the terminal device determines a current transmit power for the first channel or signal based on the transmission power available to transmit the first channel or signal during the first period when it is determined that the power lower than the target transmission power can be used to transmit the first channel or signal during the first period.

At 230, the terminal device transmits the first channel or signal during the first period with the current transmit power.

In an embodiment of the present application, in embodiments of the present application, at least one second channel or signal can be transmitted at the same time with the first channel or signal within the time unit.

In an embodiment of the present application, the first channel or signal can be a PUSCH, and the second channel or signal can be a PUCCH.

In an embodiment of the present application, within the time unit, the first channel or signal may not overlap in time domain with the second channel or signal.

In an embodiment of the present application, within the time unit, the first channel or signal may overlap in time domain with the second channel or signal.

For example, as shown in FIG. 3, the first channel or signal is a PUSCH and the second channel or signal is a PUCCH. In a slot, an overlap of symbols in time domain can exist. That is, not only PUSCH but also PUCCH are transmitted over the symbol in time domain.

In an embodiment of the present application, within the time unit, the first channel or signal may not overlap in frequency domain with the second channel or signal.

In an embodiment of the present application, a priority for transmitting the second channel or signal may be higher than that for transmitting the first channel or signal.

Embodiments of the present application are described below based on an assumption that not only the first channel or signal but also the second channel or signal will be transmitted in the period (wherein the resources in time domain to be occupied by the first channel or signal overlap with those to be occupied by the second channel or signal) and an assumption that the priority for transmitting the second channel or signal may be higher than that for transmitting the first channel or signal. For example, there is a PUCCH supporting a variety of time length in the 5G system. The PUCCH can make a transmission using as a shortest time as a symbol in time domain in a slot. The PUSCH can make a transmission using at least one slot, for example for an eMBB service. How to allocate a transmission power of a terminal device is a concern when the terminal device simultaneously transmits the PUCCH and the PUSCH in one slot.

It should be understood that the sentence herein "not only the first channel or signal but also the second channel or signal will be transmitted" refers to that a requirement of transmitting the first channel or signal and the second channel or signal arises in some case(s), and as to whether or not to transmit or how to transmit, reference can be made to the description below.

In a case that the target transmission power $P_2$ of the second channel or signal is bigger than the maximum transmission power $P_{UE}$ of the terminal device, the second channel or signal can be transmitted during the period with the maximum transmission power $P_{UE}$ of the terminal device, without transmitting the first channel or signal.

In a case that a sum of the target transmission power $P_1$ of the first channel or signal and the target transmission power $P_2$ of the second channel or signal is equal to or smaller than the maximum transmission power $P_{UE}$ of the terminal device, the first channel or signal and the second channel or signal can be transmitted during the period with respective target transmission powers of the first and second channel or signal.

In a case that the target transmission power $P_2$ of the second channel or signal is smaller than the maximum transmission power $P_{UE}$ of the terminal device, and that the sum of the target transmission power $P_1$ of the first channel or signal and the target transmission power $P_2$ of the second channel or signal is bigger than the maximum transmission power $P_{UE}$ of the terminal device, the second channel or signal can be transmitted during the period with $P_2$. As to whether or not to transmit the first channel or signal or how to transmit the first channel or signal, it can be determined by determining whether a power lower than the target transmission power of the first channel or signal can be used to transmit the first channel or signal. As to how to determine, reference can be made to the description in the above, and it will be omitted herein for the sake of brevity.

In an embodiment of the present application, if it is determined that the power lower than the target transmission power of the first channel or signal can be used to transmit the first channel or signal, then a current transmission power (that is a transmission power to be used to transmit the first channel or signal during the period) of the first channel or signal can be determined, and then the first channel or signal can be transmitted during the period with the current transmission power.

In an embodiment of the present application, the transmission power available to transmit the first channel or signal during the period is determined based on the maximum transmission power of the terminal device and the transmission power of at least one second channel or signal within the period.

In an implementation, the difference between the maximum transmission power of the terminal device and the transmission power of at least one second channel or signal within the period is determined as the transmission power available to transmit the first channel or signal during the period.

In an embodiment of the present application, if it is determined that the power lower than the target transmission power of the first channel or signal can not be used to transmit the first channel or signal, then the first channel or signal can be punched during the period.

Figure 4:
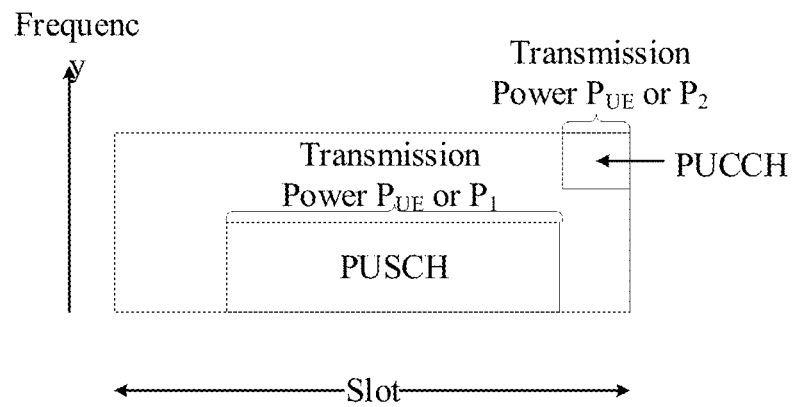
FIG. 4 is a schematic diagram of transmission of a channel or signal within a time unit according to another embodiment of the present application.

For example, as shown in FIG. 4, over the last symbol of a slot, the PUSCH is not transmitted (i.e., the PUSCH is punched), but the PUCCH is transmitted with $P_2$ or $P_{UE}$, while over the non-overlapping part, PUSCH is transmitted with $P_1$ or $P_{UE}$.

In an embodiment of the present application, in embodiments of the present application, the target transmission power of the first channel or signal may be a preset transmission power or a transmission power determined in other ways, for example the transmission power for transmitting the first channel or signal over the non-overlapped part.

In an embodiment of the present application, in embodiments of the present application, the target transmission power of the second channel or signal may be a preset transmission power or a transmission power determined in other ways.

In an embodiment of the present application, the second channel or signal carries first information indicating at least one of:
that the period is used to transmit the first channel or signal;
a power for transmitting the first channel or signal;
a difference or ratio of power for transmitting the first channel or signal between the period and another period, for example an adjacent period, within the time unit;
that the period is also used to transmit a reference signal.

In an embodiment of the present application, in embodiments of the present application, another period within the time unit carries second information indicating at least one of:
that the period is also used to transmit the first channel or signal;
a power for transmitting the first channel or signal;
a difference or ratio of power for transmitting the first channel or signal between the period and another period;
that the period is also used to transmit a reference signal.

Figure 5:
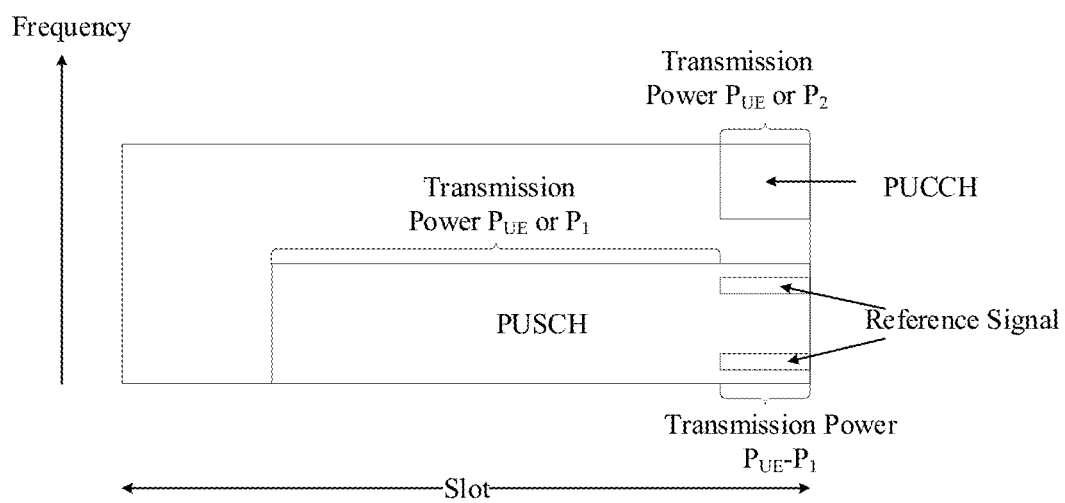
FIG. 5 is a schematic diagram of transmission of a channel or signal within a time unit according to another embodiment of the present application.

In an embodiment of the present application, in embodiments of the present application, the first channel or signal may carry the reference signal. For example, as shown in FIG. 5, the reference signal is carried in the PUSCH. The reference signal may be used by the network device to evaluate the first channel or signal. The PUCCH can be transmitted with $P_2$ over the overlapped part, while the PUSCH can be transmitted with $P_{UE}$-$P_2$ over the overlapped part, and with $P_1$ or $P_{UE}$ over the non-overlapped part.

Thus, in embodiments of the present application, a terminal device determines whether a power lower than a target transmission power of a first channel or signal can be used to transmit the first channel or signal during a first period within a time unit when a transmission power available to transmit the first channel or signal during the first period is lower than the target transmission power, wherein the transmission power available to transmit the first channel or signal during the first period is different from a power available to transmit the first channel or signal during at least one of other periods within the time unit; the terminal device determines a current transmit power for the first channel or signal based on the transmission power available to transmit the first channel or signal during the first period when it is determined that the power lower than the target transmission power can be used to transmit the first channel or signal during the first period; by transmitting the first channel or signal during the period with the current transmission power, properly allocating the transmission power of the terminal device can be achieved and a problem related to transmission of a first channel or signal in the case that a power available to transmit the first channel or signal during a period is variable can be resolved.

FIG. 6 is a schematic flow chart of a communication method 300 according to an embodiment of the present application. As shown in FIG. 6, the method 300 includes the following.

At 310, a network device receives indication information transmitted from a terminal device in a time unit.

At 320, the network device determines transmission of a first channel or signal during a first period in the time unit based on the indication information, wherein a transmission power available for the terminal device to transmit the first channel or signal during the first period is different from a power available for the terminal device to transmit the first channel or signal during at least one of other periods within the time unit.

In an embodiment of the present application, the indication information indicates at least one of:
that the first period is used to transmit the first channel or signal;
a power for transmitting the first channel or signal during the first period;
a difference or ratio in power for transmitting the first channel or signal between the first period and another period, for example an adjacent period, within the time unit;
that a reference signal for the first channel or signal is transmitted during the first period.

In an embodiment of the present application, the network device receives the indication information transmitted from the terminal device through at least one second channel or signal within the time unit.

In an embodiment of the present application, the terminal device transmits at least two channels or signals during the first period.

In an embodiment of the present application, the network device can receive/transmit a channel or signal during the first period based on transmission of the channel or signal during the first period.

For example, reception of the first channel or signal can be made when the indication information indicates that the first channel or signal is transmitted during the first period.

For example, when the indication information indicates a power for transmitting the first channel or signal during the first period, a difference or ratio of power can be determined based on the power for the first channel or signal as indicated by the indication information and the power for transmitting the first channel or signal during another period within the time unit, and the first channel or signal can be evaluated or demodulated based on the difference or ratio of power.

For example, when the indication information indicates a difference or ratio of power for transmitting the first channel or signal between the first period and another period within the time unit, the first channel or signal can be evaluated or demodulated based on the difference or ratio of power.

For example, when the indication information indicates that a reference signal for the first channel or signal is transmitted during the first period, the reference signal can be obtained during the first period based on the indication information and the first channel or signal can be evaluated.

Thus, in embodiments of the present application, the network device receives indication information transmitted from a terminal device in a time unit, wherein the transmission power available for the terminal device to transmit the first channel or signal during the first period is different from a power available for the terminal device to transmit the first channel or signal during at least one of other periods within the time unit; the network device determines transmission of the first channel or signal during the first period within the time unit and thereby determines, based on transmission of the first channel or signal during the first period, to perform proper operations, for example, to or not to receive and demodulate the first channel or signal.

FIG. 7 is a schematic block diagram of a terminal device 400 according to an embodiment of the present application. As shown in FIG. 7, the terminal device 400 includes a processing unit 410 and a transmitting unit 420. wherein, the processing unit 410 is configured to: determine whether a power lower than a target transmission power of a first channel or signal can be used to transmit the first channel or signal during a first period within a time unit when a transmission power available to transmit the first channel or signal during the first period is lower than the target transmission power, wherein the transmission power available to transmit the first channel or signal during the first period is different from a power available to transmit the first channel or signal during at least one of other periods within the time unit; determine a current transmit power for the first channel or signal based on the transmission power available to transmit the first channel or signal during the first period when it is determined that the power lower than the target transmission power can be used to transmit the first channel or signal during the first period;

The transmitting unit 420 is configured to: transmit the first channel or signal during the first period with the current transmit power.

In an embodiment of the present application, the transmission power available to transmit the first channel or signal during the first period is different from a power available to transmit the first channel or signal during an adjacent period within the time unit.

In an embodiment of the present application, the processing unit 410 is further configured to:
determine whether the power lower than the target transmission power can be used to transmit the first channel or signal during the first period based on a modulation mode and/or a modulation coding level of the first channel or signal; or
determine whether the power lower than the target transmission power can be used to transmit the first channel or signal during the first period based on whether a reference signal for the first channel or signal is transmitted during the first period.

In an embodiment of the present application, the processing unit 410 is further configured to:
determine that the power lower than the target transmission power can be used to transmit the first channel or signal during the first period when the modulation mode of the first channel or signal is a specific modulation mode, wherein an amplitude of a modulated symbol obtained by using the specific modulation mode is constant; or
determine that the power lower than the target transmission power can be used to transmit the first channel or signal during the first period when the modulation coding level of the first channel or signal is equal to or lower than a first threshold.

In an embodiment of the present application, the processing unit 410 is further configured to:
determine that the power lower than the target transmission power can be used to transmit the first channel or signal during the first period if the reference signal for the first channel or signal is transmitted through the first channel or signal.

In an embodiment of the present application, the processing unit 410 is further configured to:
determine whether the power lower than the target transmission power can be used to transmit the first channel or signal during the first period based on indication information from the network device.

In an embodiment of the present application, the processing unit 410 is further configured to:
determine the transmission power available to transmit the first channel or signal during the first period based on the maximum transmission power of the terminal device and the transmission power of at least one second channel or signal within the time unit;
the transmitting unit 420 is further configured to: transmit at least two channels or signals including the first channel or signal and at least one second channel or signal during the first period.

In an embodiment of the present application, the processing unit 410 is further configured to:
determine a difference between the maximum transmission power of the terminal device and the transmission power of the at least one second channel or signal within the time unit, as the transmission power available to transmit the first channel or signal during the first period.

In an embodiment of the present application, the second channel or signal carries first information indicating at least one of:
that the first period is also used to transmit the first channel or signal;
a power for transmitting the first channel or signal during the first period;
a difference or ratio of power for transmitting the first channel or signal between the first period and another period within the time unit;
that the first period is also used to transmit a reference signal.

It should be understood that the terminal device 400 can be corresponding to that terminal device in embodiments of methods and can implement corresponding functions of that terminal device, which are omitted herein for the sake of brevity.

Figure 8:
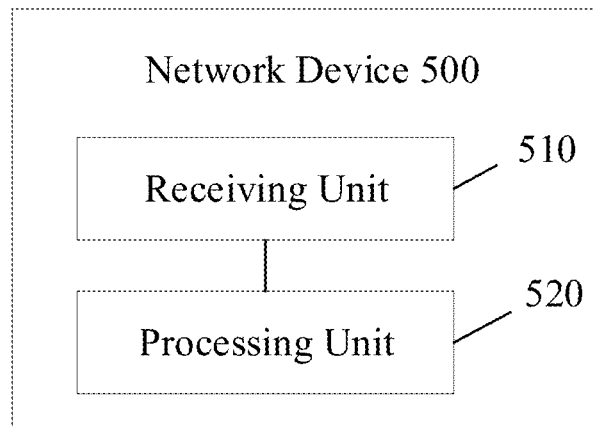
FIG. 8 is a schematic block diagram of a network device according to an embodiment of the present application.

FIG. 8 is a schematic block diagram of a network device 500 according to an embodiment of the present application. As shown in FIG. 8, the network device 500 includes a receiving unit 510 and a processing unit 520.

In an embodiment of the present application, the receiving unit 510 is configured to: receive indication information transmitted from a terminal device within a time unit; the processing unit 520 is configured to: determine transmission of a first channel or signal during a first period in the time unit based on the indication information, wherein a transmission power available for the terminal device to transmit the first channel or signal during the first period is different from a power available for the terminal device to transmit the first channel or signal during at least one of other periods within the time unit.

In an embodiment of the present application, the transmission power available to transmit the first channel or signal during the first period is different from a power available to transmit the first channel or signal during an adjacent period within the time unit.

In an embodiment of the present application, the indication information indicates at least one of:
that the first period is used to transmit the first channel or signal;
a power for transmitting the first channel or signal during the first period;
a difference or ratio of power for transmitting the first channel or signal between the first period and another period within the time unit;
that a reference signal for the first channel or signal is transmitted during the first period.

In an embodiment of the present application, the receiving unit 510 is further configured to: receive the indication information transmitted from the terminal device through at least one second channel or signal within the time unit.

It should be understood that the network device 500 can be corresponding to that network device in embodiments of methods and can implement corresponding functions of that network device, which are omitted herein for the sake of brevity.

Figure 9:
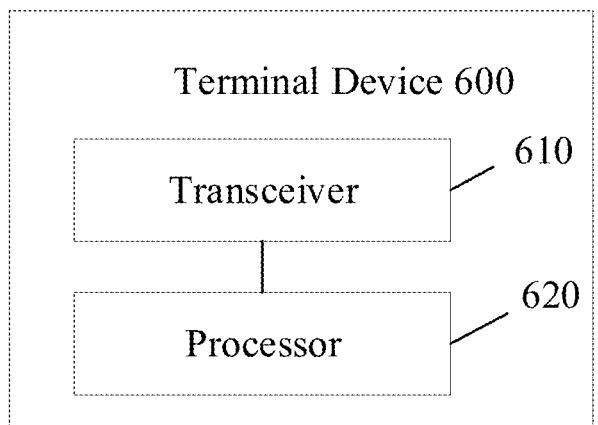
FIG. 9 is a schematic block diagram of a terminal device according to another embodiment of the present application.

FIG. 9 is a schematic block diagram of a terminal device 600 according to an embodiment of the present application. As shown in FIG. 9, the terminal device 600 includes a transceiver 610 and a processor 620.

In an embodiment of the present application, the processor 620 is configured to: determine whether a power lower than a target transmission power of a first channel or signal can be used to transmit the first channel or signal during a first period within a time unit when a transmission power available to transmit the first channel or signal during the first period is lower than the target transmission power, wherein the transmission power available to transmit the first channel or signal during the first period is different from a power available to transmit the first channel or signal during at least one of other periods within the time unit; determine a current transmit power for the first channel or signal based on the transmission power available to transmit the first channel or signal during the first period when it is determined that the power lower than the target transmission power can be used to transmit the first channel or signal during the first period; the transceiver 610 is configured to: transmit the first channel or signal during the first period with the current transmit power.

In an embodiment of the present application, the transmission power available to transmit the first channel or signal during the first period is different from a power available to transmit the first channel or signal during an adjacent period within the time unit.

In an embodiment of the present application, the processor 620 is further configured to:

determine whether the power lower than the target transmission power can be used to transmit the first channel or signal during the first period based on a modulation mode and/or a modulation coding level of the first channel or signal; or determine whether the power lower than the target transmission power can be used to transmit the first channel or signal during the first period based on whether a reference signal for the first channel or signal is transmitted during the first period.

In an embodiment of the present application, the processor 620 is further configured to:

determine that the power lower than the target transmission power can be used to transmit the first channel or signal during the first period when the modulation mode of the first channel or signal is a specific modulation mode, wherein an amplitude of a modulated symbol obtained by using the specific modulation mode is constant; or determine that the power lower than the target transmission power can be used to transmit the first channel or signal during the first period when the modulation coding level of the first channel or signal is equal to or lower than a first threshold.

In an embodiment of the present application, the processor 620 is further configured to:

determine that the power lower than the target transmission power can be used to transmit the first channel or signal during the first period if the reference signal for the first channel or signal is transmitted through the first channel or signal.

In an embodiment of the present application, the processor 620 is further configured to:

determine whether the power lower than the target transmission power can be used to transmit the first channel or signal during the first period based on indication information from the network device.

In an embodiment of the present application, the processor 620 is further configured to:

determine the transmission power available to transmit the first channel or signal during the first period based on a maximum transmission power of the terminal device and a transmission power of at least one second channel or signal in the time unit, wherein the transceiver 610 transmits at least two channels or signals including the first channel or signal and the at least one second channel or signal during the first period.

In an embodiment of the present application, the processor 620 is further configured to:

determine a difference between the maximum transmission power of the terminal device and the transmission power of the at least one second channel or signal within the time unit, as the transmission power available to transmit the first channel or signal during the first period.

In an embodiment of the present application, the second channel or signal carries first information indicating at least one of:

that the first period is also used to transmit the first channel or signal;

a power for transmitting the first channel or signal during the first period; a difference or ratio of power for transmitting the first channel or signal between the first period and another period within the time unit;

that the first period is also used to transmit a reference signal.

It should be understood that the terminal device 600 can be corresponding to that terminal device in embodiments of methods and can implement corresponding functions of that terminal device, which are omitted herein for the sake of brevity.

Figure 10:
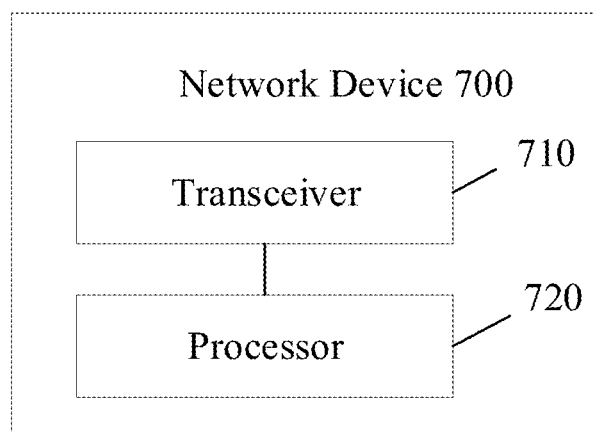
FIG. 10 is a schematic block diagram of a network device according to another embodiment of the present application.

FIG. 10 is a schematic block diagram of a terminal device 600 according to an embodiment of the present application. As shown in FIG. 10, the network device 700 includes a transceiver 710 and a processor 720.

In an embodiment of the present application, the transceiver 710 is configured to: receive indication information transmitted from a terminal device within a time unit;

In an embodiment of the present application, the processor 720 is configured to: determine transmission of a first channel or signal during a first period in the time unit based on the indication information, wherein a transmission power available for the terminal device to transmit the first channel or signal during the first period is different from a power available for the terminal device to transmit the first channel or signal during at least one of other periods within the time unit.

In an embodiment of the present application, the transmission power available to transmit the first channel or signal during the first period is different from a power available to transmit the first channel or signal during an adjacent period within the time unit.

In an embodiment of the present application, the indication information indicates at least one of:

that the first period is used to transmit the first channel or signal;

a power for transmitting the first channel or signal during the first period;

a difference or ratio of power for transmitting the first channel or signal between the first period and another period within the time unit;

that a reference signal for the first channel or signal is transmitted during the first period.

In an embodiment of the present application, the transceiver 710 is further configured to:

receive the indication information transmitted from the terminal device through at least one second channel or signal within the time unit.

It should be understood that the network device 700 can be corresponding to that network device in embodiments of methods and can implement corresponding functions of that network device, which are omitted herein for the sake of brevity.

Figure 11:
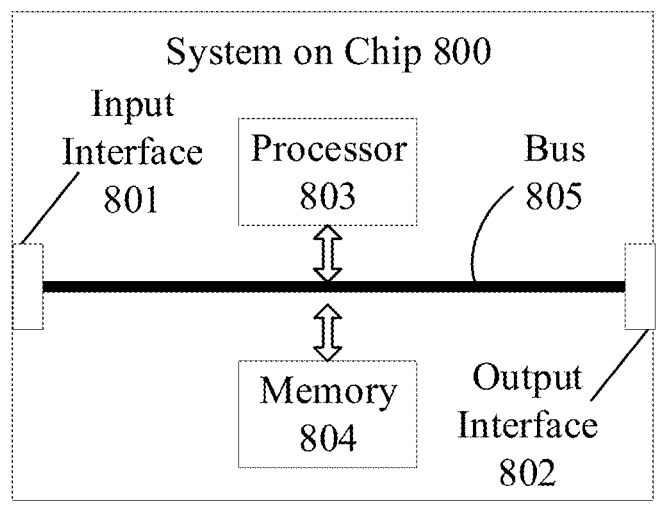
FIG. 11 is a schematic block diagram of a system on chip according to an embodiment of the present application.

FIG. 11 is a schematic structure diagram of a system on chip (SoC) according to an embodiment of the present application. The Soc 800 includes an input interface 801, an output interface 802, a processor 803 and a memory 804, wherein the processor 803 and the memory 804 are connected via a bus 805, and the processor 803 is configured to execute a code in the memory 804.

In an embodiment of the present application, the processor 803 implements, when the code is executed, methods in method embodiments implemented by a terminal device, which are omitted herein for the sake of brevity.

In an embodiment of the present application, the processor 803 implements, when the code is executed, methods in method embodiments implemented by a network device, which are omitted herein for the sake of brevity.

It may be appreciated by an ordinary person skilled in the art that various units and algorithm steps of various examples described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present application.

In addition, all functional units in the embodiments of the present application may be integrated into one processing unit. Or, each unit exists independently in physics. Or, two or more units may be integrated into one unit.

The functional units, if implemented in the form of the software functional unit and sold or used as a standalone product, may be stored in a computer-readable storage medium. Based on such an understanding, the technical solution of the present application in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present application. The foregoing storage medium includes various media that may store program codes, such as a USB flash disk, a mobile hard disk, a read-only memory (ROM), a random access memory (RAM), a magnetic disk, an optical disk, or the like.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

What is claimed is:

1. A communication method, comprising:
   determining, by a terminal device, whether a power lower than a target transmission power of a first channel or signal is allowed to be used to transmit the first channel or signal during a first period within a time unit when a transmission power available to transmit the first channel or signal during the first period is lower than the target transmission power, wherein the transmission power available to transmit the first channel or signal during the first period is different from a power available to transmit the first channel or signal during at least one of other periods within the time unit;
   determining, by the terminal device, a current transmit power to be used to transmit the first channel or signal during the first period based on the transmission power available to transmit the first channel or signal during the first period when it is determined that the power lower than the target transmission power is allowed to be used to transmit the first channel or signal during the first period; transmitting, by the terminal device, the first channel or signal during the first period with the current transmit power;
   wherein determining, by a terminal device, whether a power lower than a target transmission power of a first channel or signal is allowed to be used to transmit the first channel or signal during a first period comprises at least one of the following:
       determining, by the terminal device, whether the power lower than the target transmission power is allowed to be used to transmit the first channel or signal during the first period based on at least one of a modulation mode and a modulation coding level of the first channel or signal; or
       determining, by the terminal device, whether the power lower than the target transmission power is allowed to be used to transmit the first channel or signal during the first period based on indication information of transmission power from a network device.

2. The method of claim 1, wherein the transmission power available to transmit the first channel or signal during the first period is different from a power available to transmit the first channel or signal during an adjacent period within the time unit.

3. The method of claim 1, wherein determining, by a terminal device, whether a power lower than a target transmission power of a first channel or signal is allowed to be used to transmit the first channel or signal during a first period further comprises:
   determining, by the terminal device, whether the power lower than the target transmission power is allowed to be used to transmit the first channel or signal during the first period based on whether a reference signal for the first channel or signal is transmitted during the first period.

4. The method of claim 3, wherein determining, by the terminal device, whether the power lower than the target transmission power is allowed to be used to transmit the first channel or signal during the first period based on whether a reference signal for the first channel or signal is transmitted during the first period comprises:
   determining that the power lower than the target transmission power is allowed to be used to transmit the first channel or signal if the reference signal for the first channel or signal is transmitted through the first channel or signal during the first period.

5. The method of claim 1, wherein determining, by the terminal device, whether the power lower than the target transmission power is allowed to be used to transmit the first channel or signal during the first period based on at least one of a modulation mode and a modulation coding level of the first channel or signal comprises at least one of the following:
- determining that the power lower than the target transmission power is allowed to be used to transmit the first channel or signal during the first period when the modulation mode of the first channel or signal is a specific modulation mode, wherein an amplitude of a modulated symbol obtained by using the specific modulation mode is constant;
- determining that the power lower than the target transmission power is allowed to be used to transmit the first channel or signal during the first period when the modulation coding level of the first channel or signal is equal to or lower than a first threshold.

6. The method of claim 1, further comprising: determining the transmission power available to transmit the first channel or signal during the first period based on a maximum transmission power of the terminal device and a transmission power of at least one second channel or signal in the time unit, wherein the terminal device transmits at least two channels or signals comprising the first channel or signal and the at least one second channel or signal during the first period.

7. The method of claim 6, wherein determining the transmission power available to transmit the first channel or signal during the first period based on a maximum transmission power of the terminal device and a transmission power of at least one second channel or signal in the time unit comprising:
- determining a difference between the maximum transmission power of the terminal device and the transmission power of the at least one second channel or signal in the time unit, as the transmission power available to transmit the first channel or signal during the first period.

8. The method of claim 6, wherein the second channel or signal carries first information indicating at least one of:
- that the first period is also used to transmit the first channel or signal;
- a power for transmitting the first channel or signal during the first period;
- a difference or ratio in power for transmitting the first channel or signal between the first period and another period within the time unit;
- that the first period is also used to transmit a reference signal for the first channel or signal.

9. A terminal device, comprising a transceiver and a processor, wherein:
- the processor is configured to: determine whether a power lower than a target transmission power of a first channel or signal is allowed to be used to transmit the first channel or signal during a first period within a time unit when a transmission power available to transmit the first channel or signal during the first period is lower than the target transmission power, wherein the transmission power available to transmit the first channel or signal during the first period is different from a power available to transmit the first channel or signal during at least one of other periods within the time unit; determine a current transmit power to be used to transmit the first channel or signal during the first period based on the transmission power available to transmit the first channel or signal during the first period when it is determined that the power lower than the target transmission power is allowed to be used to transmit the first channel or signal during the first period;
- the transceiver is configured to transmit the first channel or signal during the first period with the current transmit power;
- wherein the processor is further configured to perform at least one of the following:
  - determining whether the power lower than the target transmission power is allowed to be used to transmit the first channel or signal during the first period based on at least one of a modulation mode and a modulation coding level of the first channel or signal, or
  - determining whether the power lower than the target transmission power is allowed to be used to transmit the first channel or signal during the first period based on indication information of transmission power from a network device.

10. The terminal device of claim 9, wherein the transmission power available to transmit the first channel or signal during the first period is different from a power available to transmit the first channel or signal during an adjacent period within the time unit.

11. The terminal device of claim 9, wherein the processor is further configured to perform:
- determining whether the power lower than the target transmission power is allowed to be used to transmit the first channel or signal during the first period based on whether a reference signal for the first channel or signal is transmitted during the first period.

12. The terminal device of claim 11, wherein the processor is further configured to:
- determine that the power lower than the target transmission power is allowed to be used to transmit the first channel or signal if the reference signal for the first channel or signal is transmitted through the first channel or signal during the first period.

13. The terminal device of claim 9, wherein the processor is further configured to perform at least one of the following:
- determining that the power lower than the target transmission power is allowed to be used to transmit the first channel or signal during the first period when the modulation mode of the first channel or signal is a specific modulation mode, wherein an amplitude of a modulated symbol obtained by using the specific modulation mode is constant;
- determining that the power lower than the target transmission power is allowed to be used to transmit the first channel or signal during the first period when the modulation coding level of the first channel or signal is equal to or lower than a first threshold.

14. The terminal device of claim 9, wherein the processor is further configured to:
- determine the transmission power available to transmit the first channel or signal during the first period based on a maximum transmission power of the terminal device and a transmission power of at least one second channel or signal within the time unit;
- the transceiver is further configured to: transmit at least two channels or signals comprising the first channel or signal and at least one second channel or signal during the first period.

* * * * *